US006398113B1

(12) United States Patent
Heske, III (10) Patent No.: US 6,398,113 B1
(45) Date of Patent: Jun. 4, 2002

(54) SYSTEM AND METHODS FOR COLLABORATIVE BAR CODE ERROR DETECTION AND CORRECTION

(75) Inventor: Theodore Heske, III, Suwanee, GA (US)

(73) Assignee: NCR Corporation, Dayton, OH (US)

(*) Notice: Subject to any disclaimer, the term of this patent is extended or adjusted under 35 U.S.C. 154(b) by 0 days.

(21) Appl. No.: 09/471,956

(22) Filed: Dec. 23, 1999

(51) Int. Cl.[7] .................................................. G06K 7/10
(52) U.S. Cl. ............................ 235/462.25; 235/462.01; 235/462.12
(58) Field of Search ..................... 235/462.01, 462.25, 235/472.01

(56) References Cited

U.S. PATENT DOCUMENTS

| 5,365,049 A | * 11/1994 | Peng .......................... 235/462 |
| 5,889,270 A | * 3/1999 | van Haagen et al. ... 235/462.01 |
| 5,936,224 A | * 8/1999 | Shimizu et al. ......... 235/462.01 |
| 5,939,700 A | * 8/1999 | Ackley ................... 235/462.01 |
| 5,965,863 A | * 10/1999 | Parker et al. ........... 235/462.25 |
| 6,098,887 A | * 8/2000 | Figarella et al. ....... 235/472.01 |
| 6,189,792 B1 | * 2/2001 | Heske, III ............... 235/462.01 |

* cited by examiner

Primary Examiner—Michael G. Lee
Assistant Examiner—Ahshik Kim
(74) Attorney, Agent, or Firm—Priest & Goldstein, PLLC (57) ABSTRACT

A system for collaborative bar code error detection and correction comprises a network of individual scanning entities for scanning bar-coded labels. Each individual scanning entity includes a scanning system having a decoder for decoding scanned bar code information and a printhead defect identifier for identifying printhead defects from scanned bar code information that cannot be decoded and for constructing printhead defect models for use in correcting future bar code scans. A log is provided at each individual scanning entity for storing locally constructed printhead defect models and printhead defect models that have been constructed at other scanning entities in the network. Each individual scanning entity has an error corrector for correcting erroneous scanned bar code information using the locally stored printhead defect models. Further, each scanning entity includes a network connection for broadcasting locally constructed printhead defect models to the network and for receiving broadcasts of printhead defect models constructed at other scanning entities in the network.

12 Claims, 7 Drawing Sheets

SYSTEM AND METHODS FOR COLLABORATIVE BAR CODE ERROR DETECTION AND CORRECTION

BACKGROUND OF THE INVENTION

1. Field of the Invention

The present invention relates generally to improvements in networked multi-entity systems for scanning bar codes, and particularly to advantageous aspects of a system and methods for collaborative bar code error detection and correction in a networked multi-entity environment.

2. Description of the Prior Art

Bar coding systems, such as the Uniform Product Code (UPC) system, are commonly used to identify items, such as products for sale in a retail store. In such systems, bar codes consisting of a series of bars and spaces of varying widths are printed onto labels that are affixed to the products for sale, or are printed directly onto the product packaging. Scanners at the checkout terminals are then used to read the bar codes. This approach allows more information to be entered in less time, as scanning requires significantly less time than manually entering pricing and product identification information. Further, the use of bar codes eliminates errors arising from keyboarding errors by checkout personnel.

Bar-coded labels are not always printed perfectly. Imperfections caused by the printing process frequently render the printed bar code unreadable to the bar code scanning equipment. However, systems have been developed that are able to detect and correct certain classes of label defects. These include, for example, U.S. Pat. No. 5,767,498, assigned to the assignee of the present application and incorporated herein by reference in its entirety. Such systems have operated as non-networked, individual entities. Thus, a scanner incorporating one of these error detection and correction systems is only able to learn and act upon the data seen by that scanner, without being able to take advantage of data from other scanners.

SUMMARY OF THE INVENTION

One aspect of the invention provides a system for collaborative bar code error detection and correction, comprising a network of individual scanning entities for scanning bar-coded labels. Each individual scanning entity includes a scanning system having a decoder for decoding scanned bar code information and a printhead defect identifier for identifying printhead defects from scanned bar code information that cannot be decoded and for constructing printhead defect models for use in correcting future bar code scans. A log is provided at each individual scanning entity for storing locally constructed printhead defect models and printhead defect models that have been constructed at other scanning entities in the network. Each individual scanning entity has an error corrector for correcting erroneous scanned bar code information using the locally stored printhead defect models. Further, each scanning entity includes a network connection for broadcasting locally constructed printhead defect models to the network and for receiving broadcasts of printhead defect models constructed at other scanning entities in the network.

Additional features and advantages of the present invention will become apparent by reference to the following detailed description and accompanying drawings.

DETAILED DESCRIPTION

One aspect of the invention provides systems and methods whereby individual scanning entities, connected by a communication network, may share information with and receive like information from other scanning entities connected with the same network. In this multi-entity network, scanners collaborate to surpass the error detection and correction capabilities of any single bar code scanning entity. The present system may be used in conjunction with previously developed scanning systems, including those disclosed in U.S. Pat. No. 5,767,498 and United States patent application Ser. No. 09/460,895, entitled "System and Methods for Exemplar Based Bar Code Error Detection and Correction," filed on Dec. 14, 1999, both of which are assigned to the assignee of the present application and incorporated herein by reference in their entirety.

Figure 1:
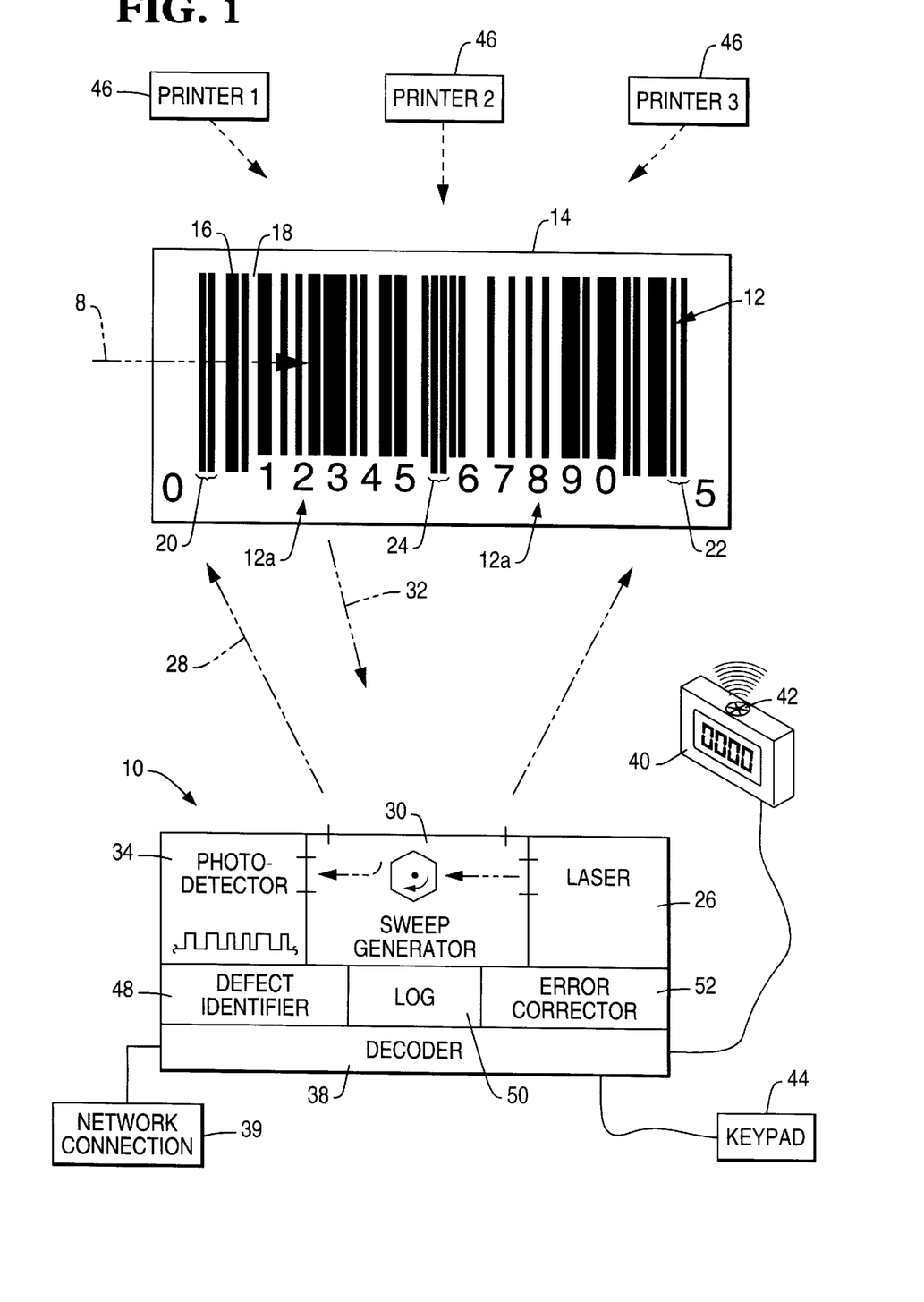
FIG. 1 shows a schematic drawing of an individual scanning entity for use in a first embodiment of the present invention.

FIG. 1 shows a schematic diagram of an exemplary embodiment of a laser bar code scanner 10 that may advantageously be used in conjunction with the present invention. The scanner 10 scans and decodes a conventional bar code 12 printed onto a suitable label 14. The bar code 12 may also be printed directly onto product packaging. The bar code 12 shown in FIG. 1 includes a plurality of dark bars 16 and white spaces 18, which are straight and parallel to each other. The bars and spaces are arranged in a plurality of sequential groups defining respective characters of equal width. In the UPC symbology, a character is defined as having two bars 16 and two spaces 18 of varying widths. The specified width of a single UPC character must, by specification, be 7 modules, each module being dark or white. Thus, within a character, each bar 16 may consist of 1, 2, 3 or 4 contiguous dark modules, and each space 18 may consist of 1, 2, 3 or 4 contiguous white modules, so long as the total width of the character is 7 modules. It should be noted that although the present invention is discussed in connection with UPC coding, the invention is also applicable to other bar codes and coding systems.

In the exemplary bar code 12 shown in FIG. 1, the bar code conventionally starts with a left margin character 20, ends with a right margin character 22, and has a center reference character 24 with the remaining bars and spaces defining desired data characters. As indicated above, each of the data characters hats a total width of seven modules, each of which can be either dark or light, and which together form two bars and two spaces. As further shown in FIG. 1, the encoded data is typically also printed in human-readable form 12a underneath the bar code 12.

As shown in FIG. 1, the scanner 10 includes a conventional scanning mechanism for optically scanning the bar code 12 sequentially across the bars 16 and spaces 18 over the total width of the bar code 12 from the left margin character 20 to the right margin character 22. In the illustrated embodiment of the invention, scanning is accomplished by using a laser 26 which emits a suitable laser beam 28 that is scanned across the face of the bar code 12 by a sweep generator 30, which may take the form of a rotating multifaceted mirror. The laser beam 28 is scanned transversely across the bar code 12 in a scan direction S so that back scattered light 32 reflects off the bars 16 and spaces 18 back to the scanner 10. Since the bars 16 are dark, very little light is back scattered therefrom, whereas the spaces 16 are substantially white and more effectively back scatter light to the scanner 10.

A photodetector 34 is provided in the scanner 10 and is suitably optically aligned therein for receiving the back scattered light 32 and producing an electrical bar code signature 36 alternating in intensity between maximum and minimum values corresponding with the back scattered light 32 from the spaces 18 and bars 16, respectively. The time duration of the maximum and minimum intensity portions of the signature 36 corresponds with the varying widths of the bars and spaces. Since the scan beam 28 is scanned across the bar code 12 at a known and constant speed, the bar code signature 36 is representative of the bar code 12 itself and may be decoded in a decoder 38 specifically configured for the corresponding bar code symbology printed on the label 14.

The decoder 38 may take any conventional form. In the present embodiment of the invention, the decoder 38 is a digitally programmable microprocessor containing suitable software for analyzing the bar code signature 36 and decoding the data contained therein. A suitable network connection 39 is provided for connecting the decoder 38 into a network including other scanning entities. The scanner 10 is electrically connected to a suitable display 40, which may be used for displaying certain information encoded in the bar code 12, such as the price of a consumer product represented by the bar code. When the bar code 12 is accurately scanned and decoded, the data may be presented on the display 40, and a small speaker 42 operatively joined to the scanner 10 may beep to indicate successful decoding of the bar code 12.

When the bar code 12 cannot be decoded, human intervention is typically required. After a few unsuccessful attempts to scan the bar code label, a human operator will then enter the bar-coded information by hand at a numerical keypad 44, using the numerical data 12a printed underneath the bar code 12. The keypad 44 can be part of a point-of-sale (POS) terminal that is operatively coupled to the scanning system 10.

The bar code 12 shown in FIG. 1 is typically printed using a conventional linear printer 46, three of which are illustrated schematically in FIG. 1. Multiple printers 46 are illustrated because the scanner 10 is typically used in a retail store, in which the bar codes may be printed in-house or by outside suppliers using a substantial number of different printers 46.

Errors in the bar code 12 may result from defects in the printer 46 used to print the bar code label 14. Accordingly, the scanning system 10 includes a printhead defect identifier module 48 for identifying printhead defects. These identified defects are then stored in a log 50, which are used by an error corrector module 52 to correct future scans.

Figure 2:
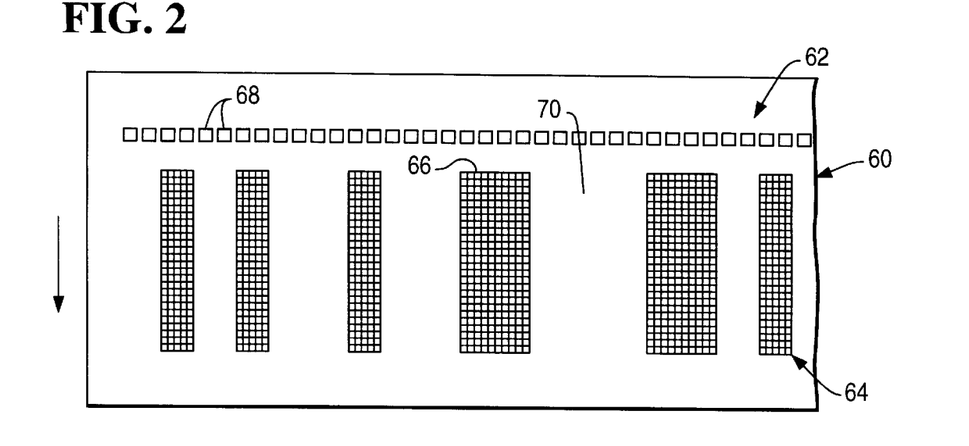
FIG. 2 shows an enlarged left-margin portion of an exemplary bar code label and a linear printhead used to print the bar code label.

FIG. 2 shows an enlarged left-margin portion of an exemplary bar code label 60 and a printer 62 used to print a bar code 64 onto the label 60. The linear printer 62 is illustrated schematically positioned adjacent to the label 60 for conventionally printing the bars 66 thereon. The linear printer 62 includes a linear printhead defined by a row of individual thermal print elements 68. Each print element 70 in a linear thermal printer is heated under individual control for use with thermally sensitive paper defining the label 60. As the label 60 illustrated in FIG. 2 is moved in a downward direction as shown relative to the printhead elements 68, respective print elements 68 are heated for thermally darkening the label 60 below the corresponding elements 68 for producing the desired bars 66, with the spaces 70 being formed where the respective print elements 62 are unheated.

The linear resolution of the printer and the minimum required width for each module determines the number of printhead elements that must be used to print each module in the bar code. One representative thermal printhead has a linear resolution of 137 print elements per inch, or 7.3 mils per element, and can therefore only print modules having a width that is a multiple of 7.3 mils. By specification, the UPC minimum module must exceed 9 mils. Therefore, the narrowest module that could be printed by the representative printer that would cover the minimum bar width size would be 14.6 mil, i.e., the width of two adjacent print elements 68. The majority of conventional/linear printheads used for printing bar code labels use either two or three print elements 68 for each bar code module with FIG. 2 illustrating the use of two print elements 68 per module. It will be recalled that each UPC character is composed of seven modules that form two bars and two spaces of varying widths.

A common failure of a linear printer 62 is the breakage of an individual printhead element 68. In this case, the printer 62 is unable to print at the location of the failed element. This will result in a white space on the label where a dark space is intended. For a bar code label, a failed element found where a dark bar is required will produce a recurring thin gap along the length of the bar where printing is absent. This gap typically leads to decoding failure.

Figure 3:
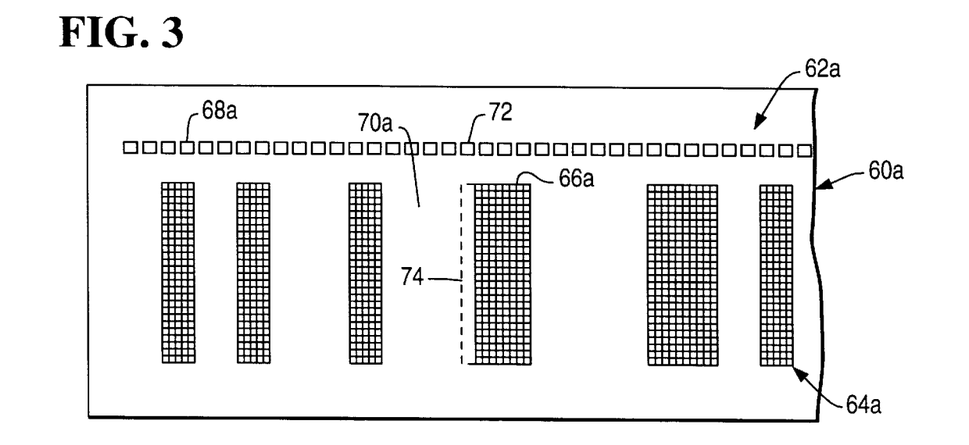
FIG. 3 illustrates a defective printhead element causing an error in the bar code.
Figure 4:
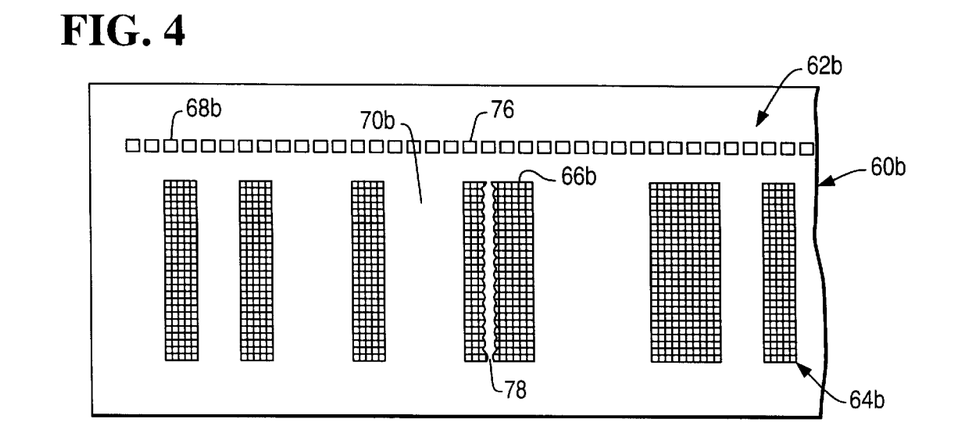
FIG. 4 illustrates another example of a defective printhead element causing a different error in the bar code.

FIG. 3 shows a bar-coded label 60a and a printer 62a corresponding to the bar-coded label 60 and printer 62 of FIG. 2, except that a failure of one element 72 in the array of printhead elements 68a has occurred. This defective element 72 produces a corresponding gap 74 in the bar code 94a. FIG. 4 shows a bar-coded label 60b and printer 62b where a printhead element failure 76 has occurred in a different position in the array of printhead elements 68b, producing a corresponding gap 78 in a different location in the bar code 64b.

Figure 5:
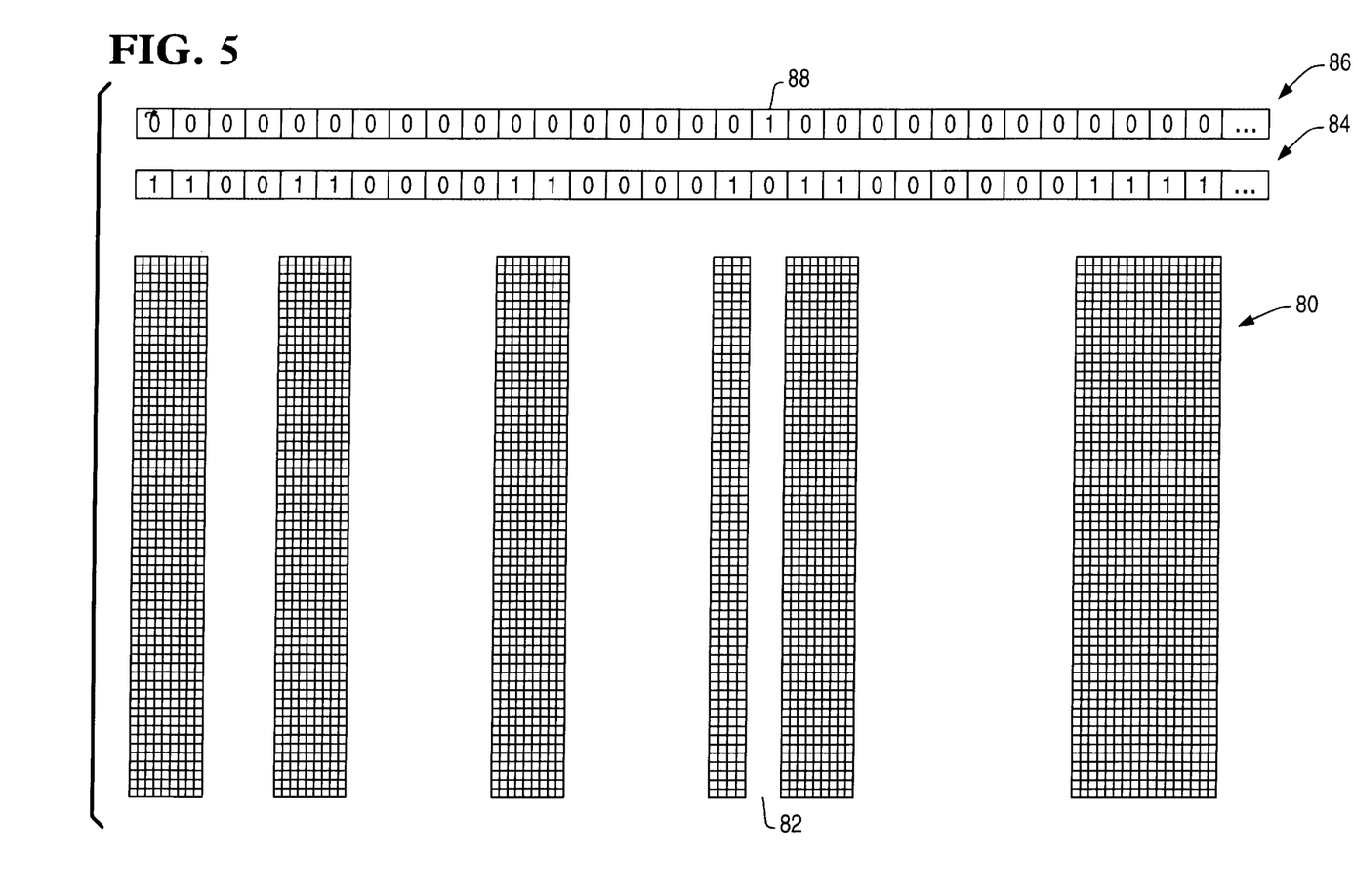
FIG. 5 shows an enlarged left-margin portion of an erroneous bar code, a numerical model of the bar code, and a printhead defect model.

Systems have been developed that are able to locate individual printhead element failures, such as those illustrated in FIGS. 3 and 4, and construct a numerical model of the printhead identifying the defective printhead elements. These systems are described in U.S. Pat. No. 5,767,498, and in U.S. patent application Ser. No. 09/460,895, entitled "System and Methods for Exemplar Based Bar Code Error Detection and Correction," filed on Dec. 14, 1999, mentioned above, which are incorporated herein by reference in their entirety. FIG. 5 shows a printed bar code 80 having an erroneous gap 82 therein. Using the techniques described in U.S. Pat. No. 5,767,498, and in U.S. patent application Ser. No. 09/460,895, it is possible to construct a numerical model 84 of the scanned bar code 80. The model 84 is a linear array of cells with a digital "1" corresponding to a dark portion of the printed label and a digital "0" corresponding to a light portion of the printed label. The number of cells in the model 84 is chosen such that each module width of the bar code 80 may be mapped onto an integer number of cells. In the present example, there is a one-to-one correspondence between the cells in the model 84 and the printhead elements in the linear printer used to print the bar code 80. Thus, because in the present example two printhead elements are used to print each module of the bar code 80, the number of cells in the model 84 is double the number of modules in the bar code 80.

Using the model 84 of the scanned bar code information, it is then possible to identify defective printhead elements in the printer used to print the bar code 80 and to construct a model of the printhead 86 including the identified defects. As shown in FIG. 5, a digital "0" indicates a properly functioning printhead element, and a digital "1" indicates a defective printhead element. Thus, the printhead defect model 86 in FIG. 5 shows a printhead defect 88 corresponding to the gap 82 in the bar code 80. In U.S. Pat. No. 5,767,498, the printhead defect model 86 is constructed based upon an analysis of the widths of bars and spaces in the erroneous bar code. As described in greater detail therein, defective printhead elements are located in an erroneous bar code by analyzing bars and spaces having a measured width that does not correspond to an integer number of modules. In U.S. patent application Ser. No. 09/460,895, the printhead defect model 86 is constructed based upon a comparison between the scanned bar code information and exemplary bar code information obtained in an intervention by a human operator.

Figure 6:
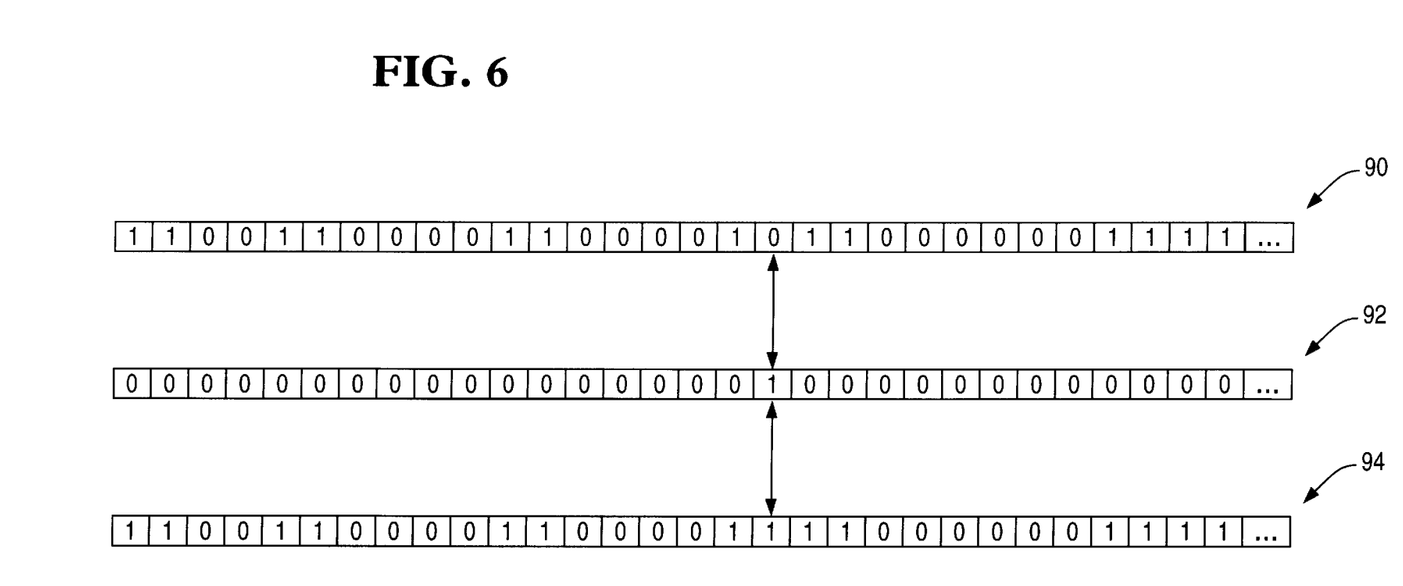
FIG. 6 illustrates the correction of erroneous scanned bar code information using a stored printhead defect model.

The printhead defect models 86 containing the defective printhead element information are stored in a log for use in correcting later scans. FIG. 6 illustrates a technique that can be used to correct a bar code that is indecipherable by the scanning system because of a printhead element failure. Although the scanning system is unable to decipher the scanned information, the system is nonetheless able to obtain detailed, accurate information as to the location of bars and spaces as they actually appear on the scanned label.

Figure 7:
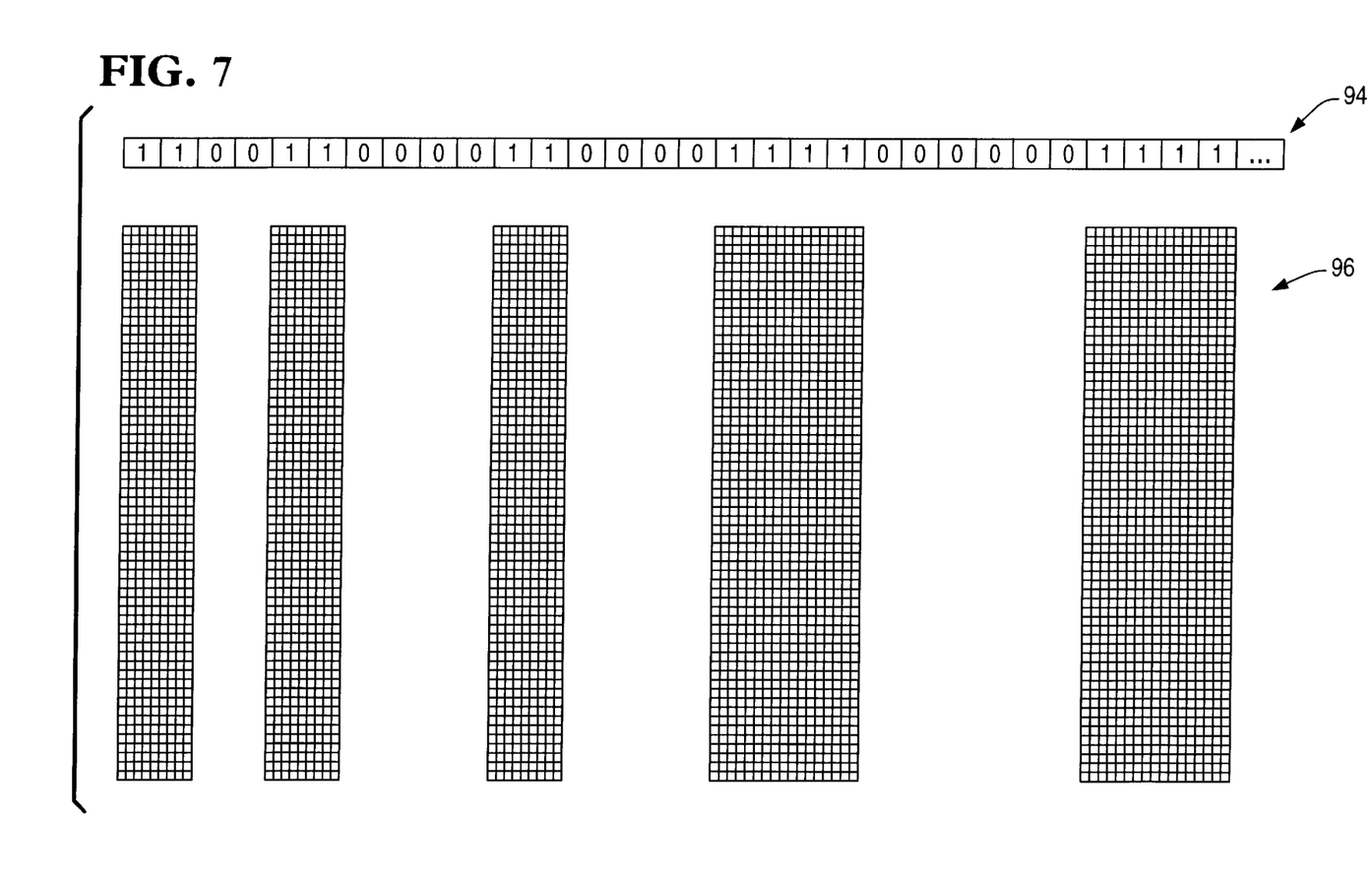
FIG. 7 shows the corrected bar code resulting from the correction operation illustrated in FIG. 6.

The information obtained from the scan is then mapped onto a linear array 90 corresponding in size to the stored printhead defect models, similar to the technique used in FIG. 5 to create the numerical model 84 from bar code 80. Again, a digital "1" is used to represent dark portions of the scanned bar code and a digital "0" is used to represent the light portions. The scanning system then attempts to correct the scanned bar code information by adding to the scanned bar code information in turn each of the printhead defect models stored in the log and attempting to decipher the corrected bar code information. FIG. 6 shows a stored printhead defect model 92 corresponding to the printhead defect model 86 that was generated in FIG. 5. When the printhead defect model 92 is added to array 90, the result is a corrected array 94. As illustrated in FIG. 7, the corrected array 94 corresponds to a corrected bar code 96, which can now be decoded by the scanner.

In current scanning systems that include error detection and correction features such as those described above, the printhead defect model information is typically stored locally at each individual scanning entity. Thus, individual scanning entities are unable to take advantage of printhead defect models stored by other individual scanning entities. The present invention is directed to a collaborative approach to error detection and error correction in bar code labels. The collaboration is achieved by allowing the sharing of error detection and correction information among multiple scanner entities connected by a communication network. In principle, any level of information acquired by an individual scanner entity may be shared with other scanner entities. However, according to one aspect of the present invention, a specific subset of information, the printhead defect model, is used as the minimum bandwidth implementation of collaboration over a shared communication network. Thus, the invention improves scanned throughput by enabling faster, more comprehensive error correction of faulty bar-coded labels.

Figure 8:
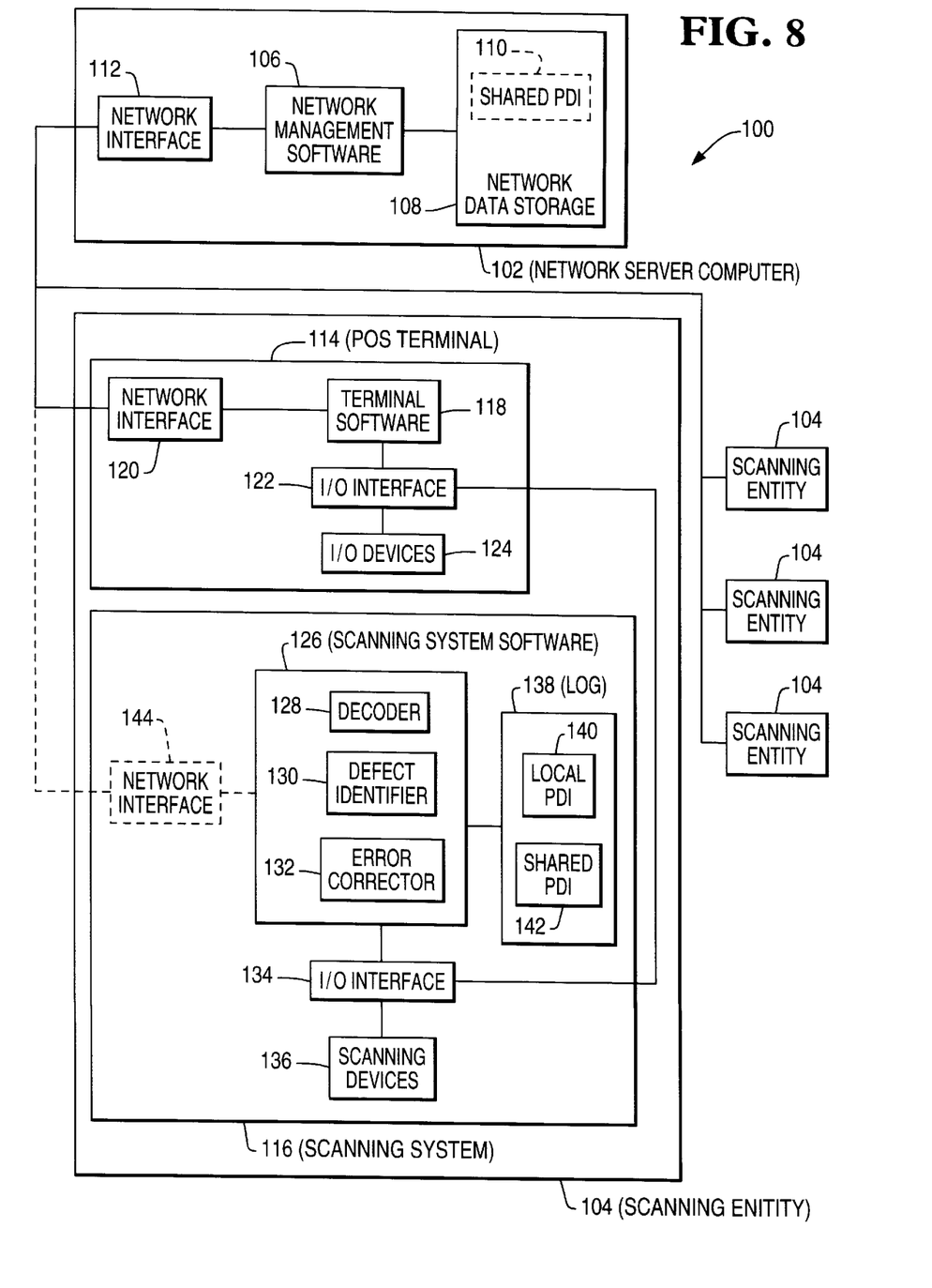
FIG. 8 shows a schematic diagram of a first embodiment of a network of scanning entities according to the invention.

FIG. 8 shows a first embodiment of a multi-entity collaborative bar code error detection and correction system 100 according to the present invention. The system 100 includes a network server computer 102 that administers a network of individual scanning entities 104 that may be located throughout a retail store. It would also be possible for some or all of the individual scanning entities 104 to be located off-site and connected into the network through an internet connection or some other connection providing adequately timely communication. The network server computer 102 includes network management software 106 that controls the reading of data from and the writing of data to network data storage 108, which includes conventional short-term and long-term storage media. The network data storage optionally includes stored shared printhead defect information (PDI) 110, described in further detail below. The network management software 106 control communication with the network of individual scanning entities via a suitable network interface 112.

In the present embodiment of the system 100, each individual scanning entity 104 includes a POS terminal 114 and a scanning system 116. The POS terminal 114 and the scanning system 116 may be housed separately, or may be integrated into a single unit. The POS terminal 114 runs suitable terminal software 118 that controls communication with the network server computer 102 via a network interface 120. In addition, a local input/output (I/O) interface 122 is provided to allow the terminal software 118 to control various terminal I/O devices 124, which typically include a display, a keyboard, and a speaker. In addition, the I/O interface 122 is used to operatively couple the POS terminal 114 to the scanning system 116.

The scanning system 116 shown in FIG. 8 corresponds to the scanning system 10 shown in FIG. 1. It is controlled by suitable scanning system software 126 that includes a decoder module 128, a defect identifier module 130 and an error corrector module 132 corresponding to the decoder 38, defect identifier 48 and error corrector 52 shown in FIG. 1. An I/O interface 134 is provided for allowing the scanning system software 126 to control communication with the system's scanning devices 136. As shown in FIG. 1, the scanning devices 130 include a laser 26, a sweep generator 30, and a photodetector 34. In addition, the I/O interface 134 is used to couple the scanning system 116 the POS terminal 114.

The scanning system software 126 controls the reading of data from, and the writing of data to, a local log 138, which includes conventional short-term and long-term storage media. As described in further detail below, the log 138 includes both locally generated printhead defect information (PDI) 140 and shared PDI 142, which has been generated at another individual scanning entity 104 in the network and broadcast to all of the scanning entities 104 for use in correcting scans. Finally, the scanning system 116 includes an optional network interface 144 for allowing the scanning system 116 to communicate directly with the network server computer 102. The network interface 144 allows the scanning system 116 to operate independently of the POS terminal 114. However, the scanning system 116 may also be configured to communicate with the network server computer 102 through the network interface 120 of the POS terminal 114.

The scanning system 116 of each individual scanning entity 104 is used to scan bar-coded data, as described above. When a bar-coded label is indecipherable by the scanning system software 126, the scanning system software 126 generates a suitable printhead defect model containing printhead defect information (PDI) that is stored locally in the log 138 for use in correcting future scans. The local PDI 140 is used to correct scans, as illustrated in FIGS. 6 and 7, discussed above. In addition, the log 132 also contains shared PDI 142, i.e., printhead defect information that is broadcast by the network server computer 102 to the entire network of individual scanning entities 104 and stored locally. This shared printhead defect information 142 is used in the same manner as the local printhead defect information 140, as described above.

In the present embodiment of the invention, it is contemplated that the network server computer 102 will perform a simple pass-through function with respect to the printhead defect information that is broadcast throughout the network. However, in a further embodiment of the invention, the network server computer 102 can be configured to perform higher-level functions with respect to the shared printhead defect information. In such an embodiment of the invention, shared PDI 110 is stored in network data storage 108 for use by the network management software 106.

Figure 9:
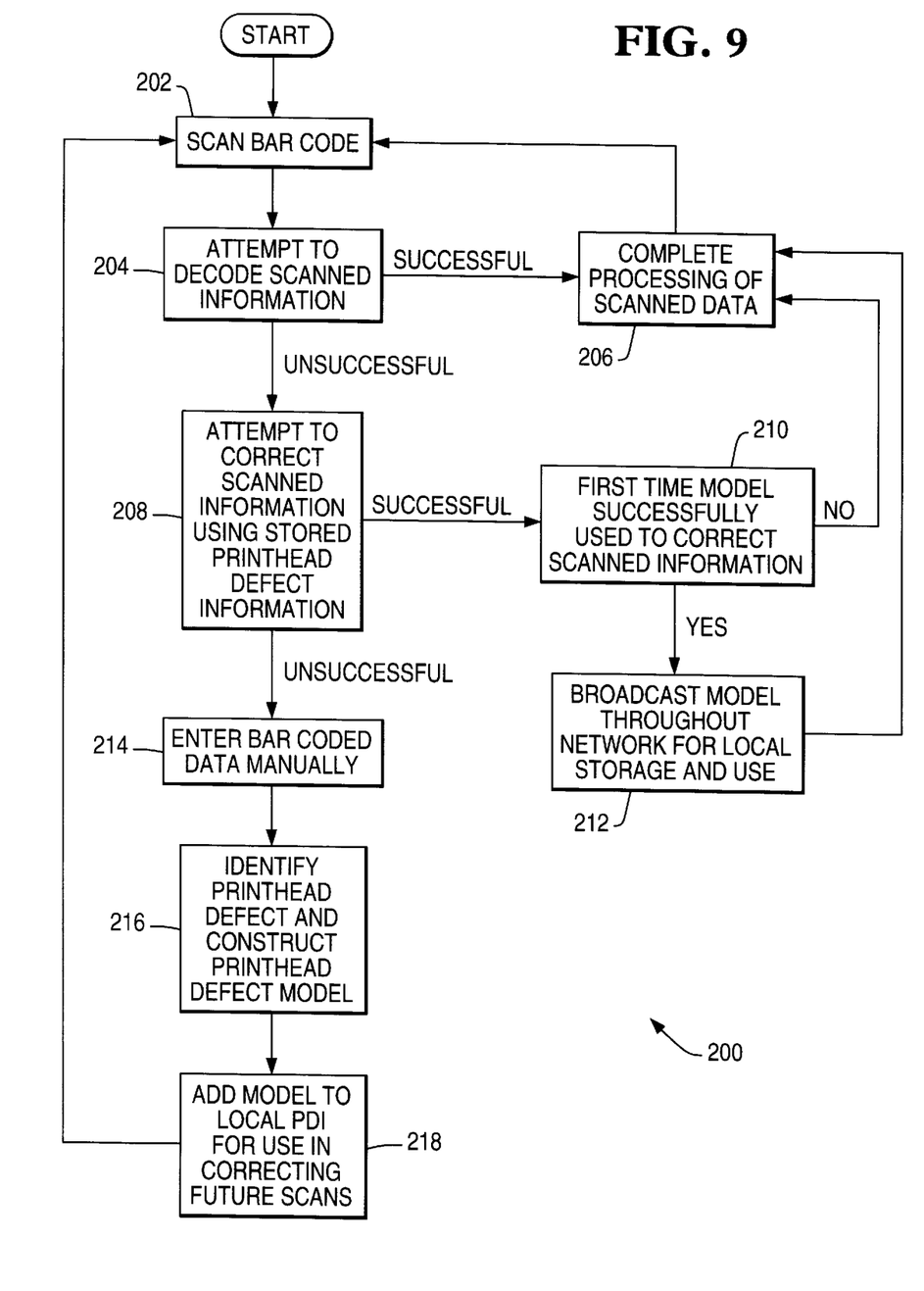
FIG. 9 shows a flowchart of a first embodiment of a collaborative bar code error and detection method according to the invention.

FIG. 9 is a flowchart of a collaboration method 200 according to the present invention for allowing multiple scanning entities to share locally developed printhead defect information. In step 202, a bar-coded label is scanned at an individual scanning entity in a network of scanning entities, such as the network illustrated in FIG. 8 and described above. In step 204, the scanning entity attempts to decode the scanned bar code information. If the scanning entity is successful in decoding the scanned information, then in step 206 the processing of the scanned data is completed, and the system returns to step 202 to scan the next bar-coded label. However, if in step 204 the scanning entity is unable to decode the scanned information, then the system proceeds to step 208.

In step 208, the scanning entity attempts to correct the scanned information using stored printhead defect information. The stored PDI includes both locally generated PDI, as well as shared PDI, described below. If the scanning entity is successful in using a stored local printhead defect model, that is, if the local printhead defect model has made a "good" correction, then in step 210, the scanning entity determines whether this is the first time that the stored local printhead defect model has been successfully used to correct scanned information. If this is the case, then in step 212, the stored local printhead defect model is broadcast through the network of scanning entities and stored locally at each terminal for use in correcting future scans. The scanning entity then proceeds to step 206, in which it completes the processing of the scanned data, and then to step 202, in which it scans the next bar-coded label. If this is not the first time that the printhead defect model has been used to successfully correct scanned information, or if the printhead defect model was a shared model rather than a local model, the scanning entity skips step 212 and proceeds directly to step 206.

If in step 208, the scanning entity is unable to correct the scanned information using the stored printhead defect information, then in step 214, the scanning entity prompts the human operator of the scanning entity to enter the bar-coded data manually using a keypad, touchscreen, or other suitable input device, and the system then completes processing of the manually entered bar-coded data. In step 216, the scanning entity identifies any printhead defects in the scanned bar code and then constructs a printhead defect model, as described above. In step 218, the scanning entity then stores the printhead defect model as local printhead defect information. As discussed above, in the present embodiment of the invention, the newly constructed printhead defect model is not broadcast through the network to other scanning entities until the model has contributed to a "good" correction of a bar code in a future scan. Finally, the scanning entity returns to step 202 to scan the next bar-coded label.

It will be appreciated that there are several levels of hierarchy involved in a single-entity bar code error correction. In principle, any or all of the information acquired and computed by the single scanning entity may be shared with other scanning entities using the techniques described above. Practical constraints, such as at the bandwidth of the communication channel linking the entities in a network and the amount of computational power available to process the shared information determine the best information to share. At the highest level in the hierarchy of a single scanning entity lies the printhead defect model that has already contributed to a good correction of a defective bar-coded label. The above-described embodiment of the invention therefore uses printhead defect model as the primary collaborative information shared by all scanning entities.

While the foregoing description includes details which will enable those skilled in the art to practice the invention, it should be recognized that the description is illustrative in nature and that many modifications and variations thereof will be apparent to those skilled in the art having the benefit of these teachings. It is accordingly intended that the invention herein be defined solely by the claims appended hereto and that the claims be interpreted as broadly as permitted by the prior art.

I claim:

1. A system for collaborative bar code error detection and correction, comprising:

a network of individual scanning entities for scanning bar-coded labels, each individual scanning entity including a scanning system having a decoder for decoding scanned bar code information, a printhead defect identifier for identifying printhead defects from scanned bar code information that cannot be decoded by the decoder and for constructing printhead defect models for use in correcting future bar code scans, the printhead defect identifier constructing printhead defect models by comparing scanned bar code information with exemplary bar code information obtained in an intervention by a human operator, a log for storing locally constructed printhead defect models and printhead defect models that have been constructed at other scanning entities in the network, and an error corrector for correcting erroneous scanned bar code information using the printhead defect models stored in the log, each individual scanning entity including a network interface for broadcasting locally constructed printhead defect models to the network and for receiving broadcasts of printhead defect models constructed at other scanning entities in the network.

2. The system of claim 1, wherein each individual scanning entity only broadcasts a locally constructed printhead defect model to the network when the locally constructed printhead defect model has contributed to a good correction of erroneous scanned bar code information at that scanning entity.

3. The system of claim 1, wherein each scanning system includes a scanning mechanism for optically scanning bar code information for decoding by the decoder.

4. The system of claim 3, wherein the scanning mechanism includes a laser, a sweep generator, and a photodetector.

5. The system of claim 1, wherein each individual scanning entity further includes a POS terminal operatively coupled to the scanning system.

6. A scanning entity for use in a network of scanning entities for scanning bar-coded labels, the scanning entity including a scanning system having:

a decoder for decoding scanned bar code information;

a printhead defect identifier for identifying printhead defects from scanned bar code information that cannot be decoded by the decoder and for constructing printhead defect models for use in correcting future bar code scans, the printhead defect identifier constructing printhead defect models by comparing scanned bar code information with exemplary bar code information obtained in an intervention by a human operator;

a log for storing locally constructed printhead defect models and printhead defect models that have been constructed at another scanning entity in the network; and an error corrector for correcting erroneous scanned bar code information using the printhead defect models stored in the log, the scanning entity having a network interface for broadcasting locally constructed printhead defect models to the network and for receiving broadcasts of printhead defect models constructed at another scanning entity in the network.

7. The scanning entity of claim 6, wherein the scanning entity only broadcasts a locally constructed printhead defect model to the network when the locally constructed printhead defect model has contributed to a good correction of a defective bar coded label at the scanning entity.

8. The scanning entity of claim 6, wherein the scanning entity includes a point-of-sale (POS) terminal operatively coupled to the scanning system.

9. A method for collaborative bar code error correction and detection, comprising:

(a) scanning bar-coded labels utilizing a network of individual scanning entities;

(b) at each individual scanning entity, identifying printhead defects from scanned bar code information and constructing printhead defect models for use in correcting future bar code scans, the printhead defect identifier constructing printhead defect models by comparing scanned bar code information with exemplary bar code information obtained in an intervention by a human operator;

(c) at each individual scanning entity, storing locally constructed printhead defect models and printhead defect models that have been constructed at other scanning entities in the network;

(d) correcting erroneous scanned bar code information using the locally stored printhead defect models; and (e) broadcasting locally constructed printhead defect models to the network and receiving broadcasts of printhead defect models constructed at other scanning entities in the network.

10. The method of claim 9, wherein in step (e) a locally constructed printhead defect model is broadcast to the network only when the locally constructed printhead defect model has contributed to a good correction of a defective bar coded label at that scanning entity.

11. A method for collaborative bar code error correction and detection in a network of individual scanning entities, comprising:

(a) scanning a bar-coded label at an individual scanning entity;

(b) attempting to decode the scanned information at the individual scanning entity;

(c) if the decoding attempt is successful, completing processing of the scanned information;

(d) if the decoding attempt is unsuccessful, attempting to correct the scanned information using printhead defect models stored locally at the individual scanning entity, the printhead defect models being constructed by comparing scanned bar code information with exemplary bar code information obtained in an intervention by a human operator;

(e) if a locally stored printhead defect model contributes to a good correction of the scanned information, and if it is determined that this is the first time that the printhead defect model has contributed to a good correction of scanned information, broadcasting the locally stored printhead defect model throughout the network for use by other individual scanning entities in correcting future scans; and (f) if a locally stored printhead defect model contributes to a good correction of the scanned information, and if it is determined that this is not the first time that the printhead defect model has contributed to a good correction of scanned information, completing processing of the corrected scanned information without broadcasting the locally stored printhead defect model throughout the network.

12. The method of claim 11, further including the following steps performed after step (f):

(g) if the scanned information cannot be corrected using local stored printhead defect models, entering the bar-coded data manually and completing processing of the manually entered data;

(h) constructing a printhead defect model identifying defects in the printhead used to print the scanned bar-coded label, the printhead defect models being constructed by comparing scanned bar code information with exemplary bar code information obtained in an intervention by a human operator; and (i) storing the newly constructed printhead defect model locally at the individual scanning entity.

* * * * *